United States Patent
Vogman (10) Patent No.: US 7,173,831 B1
(45) Date of Patent: Feb. 6, 2007

(54) POWER CONVERTER HAVING A PRIMARY SIDE SWITCHING CIRCUIT

(75) Inventor: Viktor D. Vogman, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/233,542

(22) Filed: Sep. 23, 2005

(51) Int. Cl.
*H02M 3/335* (2006.01)
*H02M 7/538* (2006.01)

(52) U.S. Cl. .............................. 363/21.02; 363/21.04; 363/21.06; 363/131

(58) Field of Classification Search ................ 363/20, 363/21.02, 21.04, 21.06, 97, 131
See application file for complete search history.

(56) References Cited

U.S. PATENT DOCUMENTS

| | | | | |
|---|---|---|---|---|
| 5,519,599 A | * | 5/1996 | Shinada et al. | 363/21.06 |
| 5,619,403 A | * | 4/1997 | Ishikawa et al. | 363/21.06 |
| 5,708,571 A | * | 1/1998 | Shinada | 363/16 |
| 5,734,563 A | * | 3/1998 | Shinada | 363/21.06 |
| 5,999,420 A | * | 12/1999 | Aonuma et al. | 363/21.06 |
| 6,011,703 A | * | 1/2000 | Boylan et al. | 363/21.06 |
| 6,304,463 B1 | * | 10/2001 | Krugly | 363/21.06 |
| 6,414,861 B1 | * | 7/2002 | Matsumoto et al. | 363/56.1 |
| 6,477,065 B2 | * | 11/2002 | Parks | 363/21.06 |
| 6,590,786 B2 | * | 7/2003 | Gurov | 363/16 |
| 6,625,043 B2 | * | 9/2003 | Hatta et al. | 363/21.06 |
| 6,674,658 B2 | * | 1/2004 | Mao et al. | 363/127 |
| 6,760,235 B2 | * | 7/2004 | Lin et al. | 363/21.06 |
| 6,940,732 B2 | * | 9/2005 | Tobita | 363/21.06 |

OTHER PUBLICATIONS

"SC4901 COMBI-SYNC Secondary Side Synchronous Rectifier and Regulator," Semtech Corporation, Power Management Products Division, www.semtech.com, Revision Jan. 2004, pp. 1-18.

* cited by examiner

*Primary Examiner*—Bao Q. Vu
(74) *Attorney, Agent, or Firm*—Schwabe, Williamson & Wyatt, P.C.

(57) ABSTRACT

In one embodiment, an apparatus includes a transformer having a primary winding and a secondary winding and a switching circuit to facilitate a periodic application of an input voltage to the primary winding. The switching circuit includes an active switch and a capacitor commonly coupled to the primary winding. In one embodiment, the apparatus further includes a synchronous rectification circuit coupled to the secondary winding to generate a rectified signal, an output filter coupled to the synchronous rectification circuit to provide an output voltage in response to the rectified signal, and a control circuit coupled to the output filter to receive the output voltage and coupled in a switching control relationship with the active switch and the synchronous rectification circuit.

25 Claims, 5 Drawing Sheets

POWER CONVERTER HAVING A PRIMARY SIDE SWITCHING CIRCUIT

BACKGROUND

1. Technical Field

Embodiments of the present invention are related to the field of electronic devices, and in particular, to power supplies for electronic devices.

2. Description of Related Art

It is a common practice in computer and server industry to use several converter stages to convert input alternating current (AC) line voltage into isolated and regulated direct current (DC) voltages, which are supplied to processors, memory, hard drives and like devices. In recent years, interest in high density power conversion has increased substantially. Most of the topologies used for the modern power conversion applications operate in a so-called hard switching mode, in which waveforms of the converter switch have rectangular shapes. Increasing power density in such topologies is primarily based on using faster switching active components (transistors and rectifying diodes) and more compact magnetic components and capacitors. At the same time, the most effective reduction of converter dimensions may be achieved by increasing its switching frequency (permitting reduction in the transformer and filter size). A reason for not employing increased switching frequencies is that high frequency conversion in hard switching topologies is associated with a rise in switching losses, which need larger heatsinks and/or delivery of more cooling air. This significantly hinders an increase in power density. Although the hard switching topology is widely used, power density and cost/size improvements have been achieved by implementing a soft switching (resonant) or zero voltage switching technique, which is characterized by low switching losses.

DETAILED DESCRIPTION OF ILLUSTRATIVE EMBODIMENTS

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention.

Figure 1A:
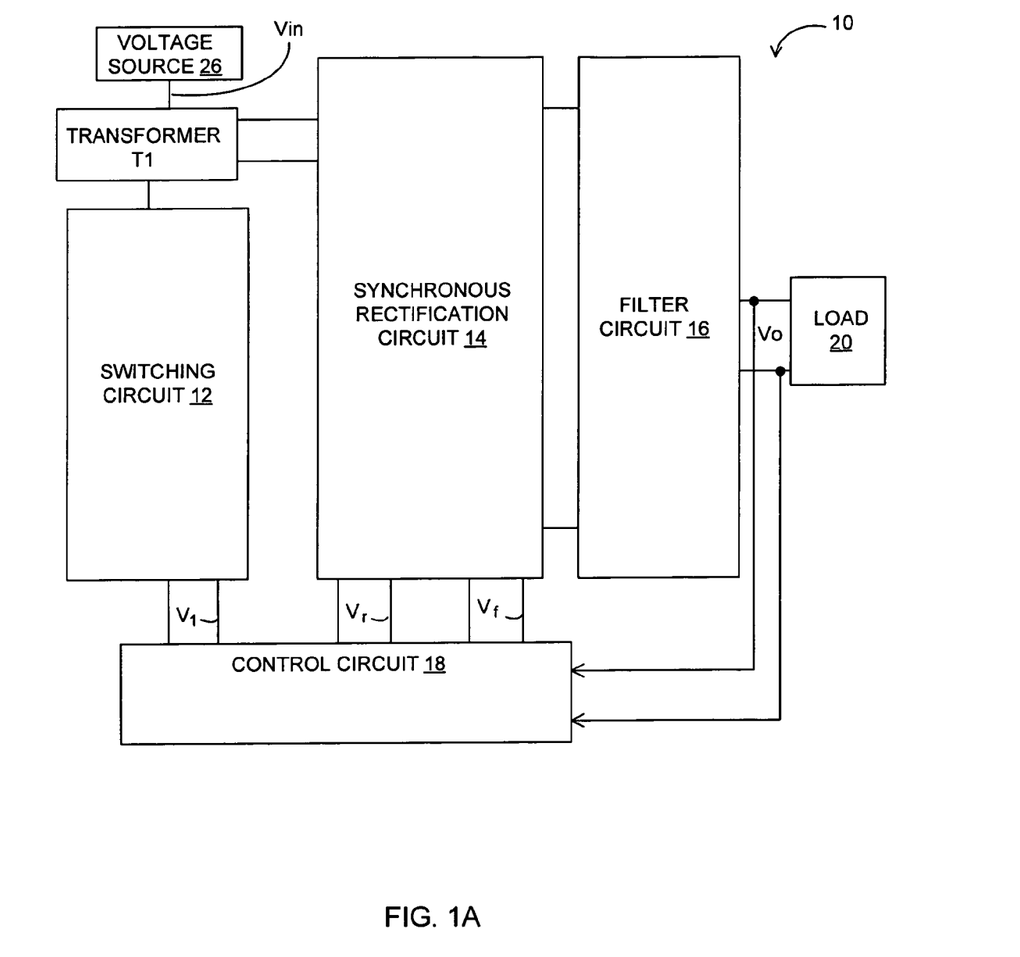
FIG. 1A is a block diagram of a power converter according to one embodiment of the present invention.
Figure 1B:
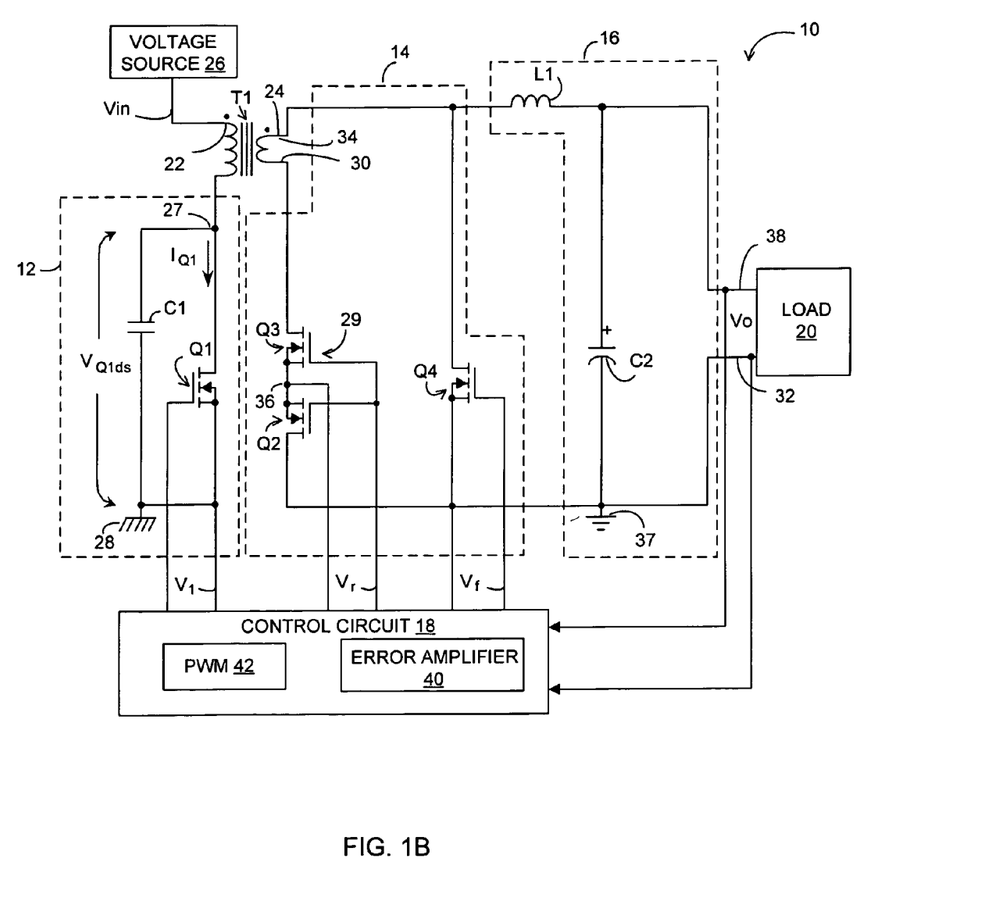
FIG. 1B is a schematic diagram of the power converter of FIG. 1A according to one embodiment of the present invention.

With reference to FIGS. 1A and 1B, a power converter 10, in accordance with one embodiment, is illustrated. In one embodiment, the power converter 10 may be a DC-to-DC, isolating, resonant converter with substantially zero voltage switching. Additionally, the power converter 10 may have post regulation. The converter 10 may include a power transformer T1 adapted to receive a DC input voltage $V_{in}$, primary side switching circuit 12 coupled to the transformer T1 to periodically apply the input voltage $V_{in}$ to the transformer T1, a synchronous rectification circuit 14 coupled to the transformer T1 to generate a rectified voltage signal, an output filter 16 coupled to the synchronous rectification circuit 14 to smooth the rectified voltage signal so as to provide an output voltage $V_o$, and a control circuit 18 to provide control voltage signals to the synchronous rectification circuit 14 and the switching circuit 12. The output voltage $V_o$ of the output filter 16 may be coupled to a load 20 and the control circuit 18.

The power transformer T1 may include a primary winding 22 and a secondary winding 24, with the polarity of the transformer T1 being shown by the dots adjacent to the windings 22 and 24. The primary winding 22 may be coupled between a voltage source 26 and a node 27. The voltage source 26 may provide the DC input voltage $V_{in}$. In one embodiment, the voltage source 26 may be a power factor correction (PFC) stage or DC distribution bus. The switching circuit 12 may include an active switch in the form of a primary switching transistor Q1 and a capacitor C1 coupled in parallel between the node 27 and a primary ground 28. Hence, the primary winding 22 may be coupled to the primary ground 28 through the switching circuit 12. The capacitor C1 is an external capacitor which is added to shunt the transistor Q1 and is not the internal parasitic capacitance of the transistor Q1. The current through the switching transistor Q1 may be designated as current $I_{Q1}$ and the voltage across the shunting capacitor C1 may be designated as voltage $V_{Q1ds}$; hence, this is also the voltage across the switching transistor Q1 since the capacitor C1 shunts the transistor Q1.

In one embodiment, the synchronous rectification circuit 14 may include (a) a bidirectional switch 29 having a pair of series connected, back-to-back active switches in the form of switching transistors Q2 and Q3 coupled between a first terminal 30 of the secondary winding 24 and a first terminal 32 of the load 20 and (b) a shunt active switch in the form of a shunt switching transistor Q4 coupled between a second terminal 34 of the secondary winding 24 and the first terminal 32 of the load 20. The sources of the switching transistors Q2 and Q3 may be commonly coupled at a node 36, which may float. The drains of switching transistors Q3 and Q4 may be coupled to opposed terminals 30 and 34, respectively, of the secondary winding 24. The drain of the switching transistor Q2 and the source of the switching transistor Q4 may be coupled to the first terminal 32 of the load 20. In one embodiment, the first terminal 32 of the load 20 (and therefore the drain of transistor Q2 and the source of transistor Q4) may be coupled to a secondary ground 37. In the general case, the primary and secondary grounds 28 and 37 may be isolated; hence, that is why the transformer T1 is used. In general, the switching transistor Q4 shunts the output filter 16 and when the bi-directional (two-way) switch 29 is ON, shunts the secondary winding 24.

In another embodiment, the switching transistors Q3 and Q4 may be coupled in series between the terminal 34 of the secondary winding 24 and the inductor L1 instead of between the terminal 30 of the secondary winding and the terminal 32 of the load 20. In one embodiment, the switching transistors Q1–Q4 may be metal oxide field effect transistors (MOSFETs), such as N-channel MOSFETs. Although not illustrated in the drawings, the MOSFET switching transistors Q1–Q4 may each be modeled as a switch, an internal parasitic body diode and an internal parasitic capacitance, with the three elements being coupled in parallel. When the gate of one of the switching transistors is ON (the gate-to-source voltage of the transistor exceeds the gate threshold voltage), the switch may characterized as being closed; otherwise, it may be characterized as being open. When the gate is ON (switch closed), the switching transistor may conduct in both directions. When the gate is OFF (switch open), the switching transistor may conduct in only one direction, which is the direction in which the body diode is forward biased and it will not conduct in the direction in which the body diode is reversed biased. However, the conduction losses of the switching transistor are greater when the current flows through just the body diode with the switching transistor's gate OFF than when the current flows through the switching transistor with its gate ON. The combination of the transistors Q2 and Q3 may be characterized as the bidirectional switch 29 in that the transistors Q2 and Q3 may block conduction in both directions when both gates are OFF or may allow transmission in both directions when both gates are ON, regardless of the polarity of the secondary winding 24. When describing the switching transistors Q1–Q4, the previously-described parallel components (e.g. body diode) used to model the switching capacitors will be referred to even though they are not explicitly illustrated in the drawings when showing the switching transistors.

In one embodiment, the output filter 16 may include an inductor L1 and a capacitor C2. This illustrative output filter 16 is sometime referred to as an L-section filter or low-pass filter. The inductor L1 may be coupled between the second terminal 34 of the secondary windings 24 and a second terminal 38 of the load 20. The capacitor C2 may be coupled in parallel with the load 20. The output filter 16 may provide an output voltage $V_o$ to the load 20. In other embodiments, the output filter 16 may comprise other filter circuits and/or may have multiple cascaded output filters.

In one embodiment, the control circuit 18 may include an error amplifier 40 and a pulse width modulator (PWM) 42. An example of a suitable control circuit 18 may be a PWM controller, model SC4901, manufactured by Semtech Corporation of Camarillo, Calif. The error amplifier 40 may be coupled to the terminals 32 and 38 of the load 20 and to a source of a reference voltage (not shown), so as to generate an error signal (not shown). The PWM 42 may be coupled to the error amplifier 40 to receive the error signal so as to generate control voltage signals $V_1$, $V_r$, and $V_f$ with control voltage signal $V_1$ being coupled to a gate of the switching transistor Q1, the control voltage signal $V_r$ being coupled to gates of the switching transistors Q2 and Q3, and the control voltage signal $V_f$ being coupled to a gate of the switching capacitor Q4. The node 36 may be coupled to the control circuit 18.

Figure 2A:
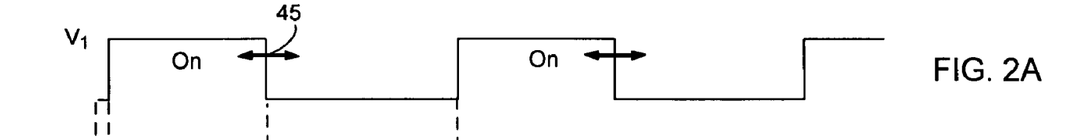
FIG. 2A is a timing diagram of a control voltage signal $V_1$ for the power converter of FIGS. 1A and 1B according to one embodiment of the present invention.
Figure 2B:
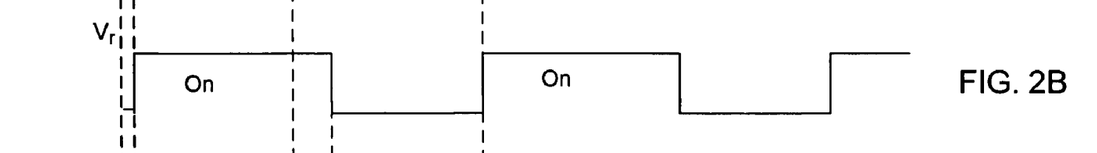
FIG. 2B is a timing diagram of a control voltage signal $V_r$ for the power converter of FIGS. 1A and 1B according to one embodiment of the present invention.
Figure 2C:
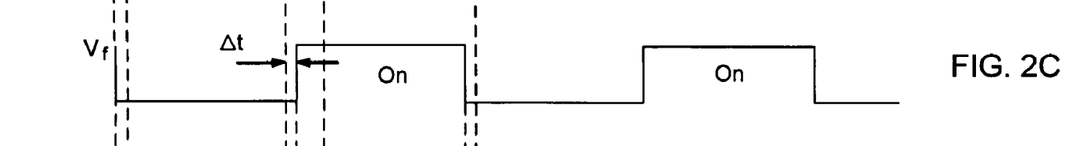
FIG. 2C is a timing diagram of a control voltage signal $V_f$ for the power converter of FIGS. 1A and 1B according to one embodiment of the present invention.
Figure 2D:
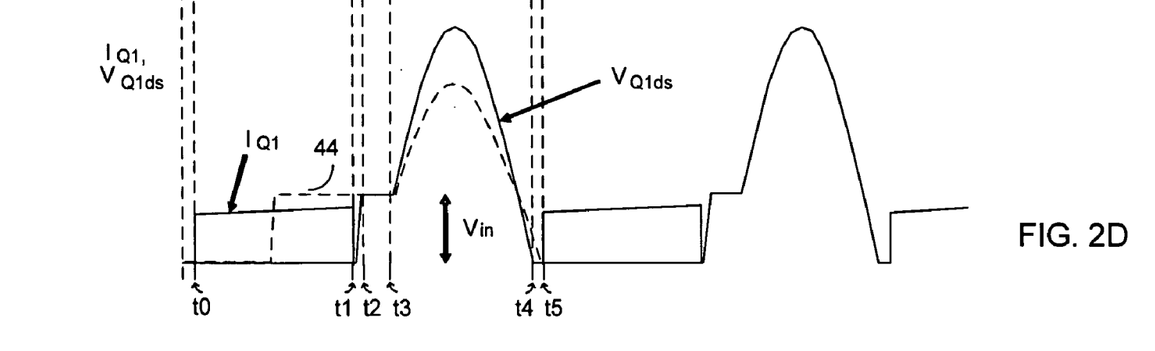
FIG. 2D is a timing diagram of a voltage across a primary side capacitor and switching transistor and a current through the switching transistor of the power converter of FIGS. 1A and 1B according to one embodiment of the present invention.

FIGS. 2A–2D provide timing diagrams for the power converter 10 of FIGS. 1A and 1B, according to one embodiment of the present invention. The operation of the power converter 10 will now be described with reference to FIGS. 1A and 1B and FIGS. 2A–2D. As previously described with respect to FIGS. 1A and 1B, the control voltage signal $V_1$ shown in FIG. 2A may be coupled to the gate of the switching transistor Q1 of FIG. 1B and may be used to switch ON (in its conducting state) and OFF (in its non-conducting state) the switching transistor Q1. The control voltage signal $V_r$ shown in FIG. 2B may be coupled to the gates of the switching transistors Q2 and Q3 of FIG. 1B and may be used to simultaneously switch ON (in its conducting state) and OFF (in its non-conducting state) the switching transistors Q2 and Q3. In other words, the gates of the switching transistors Q2 and Q3 may be commonly coupled together so that the two transistors Q2 and Q3 may be activated concurrently. The control voltage signal $V_f$ shown in FIG. 2C may be coupled to the gate of the switching transistor Q4 of FIG. 1B and may be used to switch ON (in its conducting state) and OFF (in its non-conducting state) the switching transistor Q4. FIG. 2D shows the current $I_{Q1}$ passing through the switching transistor Q1 of FIG. 1B as a function of time and further shows two examples of the voltage $V_{Q1ds}$ across the capacitor C1 and the switching transistor Q1 of FIG. 1B as a function of time, as will be described hereinafter.

Referring to FIGS. 1A–1B and FIGS. 2A–2D, the control voltage signals $V_1$ and $V_r$ transition high together at a time instant t0. When the control voltage signal $V_1$ is positive (high), the switching transistor Q1 is ON and the input voltage source $V_{in}$ is applied to the primary winding 22 of the transformer T1 (the dot ends of the primary and secondary windings 22 and 24 go positive). More specifically, the gate of the transistor Q1 is ON (in its conducting state) and connects the primary winding 22 of the transformer T1 to the primary ground 28. At the same time, a voltage pulse is generated on the secondary winding 24 of the transformer T1. Since the gates of the switching transistors Q2 and Q3 (bidirectional switch 29) also are positively biased (in their conducting states) by the control signal $V_r$ at the time instant t0, the transistors Q2 and Q3 conduct. Consequently, the terminal 30 of the secondary winding 24 is coupled to the terminal 32 of the load 20 (secondary ground 37) through the bidirectional switch 29, which allows a voltage pulse to be transferred to the input of the output filter 16. In other words, the transistors Q2 and Q3 being in their conducting state allows an inductor current to flow through the secondary winding 24 of the transformer T1. More specifically, current flows out of the dot end of the secondary winding 24 and through the inductor L1 to the load 20 and the filter capacitor C2. As a result, the inductor L1 of the output filter 16 stores current (energy). The current from the inductor L1 flows partly through the load 20 and partly through the capacitor C2 and then through the conducting bi-directional switch 29 back into the secondary winding 24. During this period of time, the switching transistor Q4 receives the voltage control signal $V_f$ with a negative polarity; hence, its gate is OFF (in its non-conducting state) and its body diode is negatively biased (reversed biased) so that no current flows through the switching transistor Q4.

Prior to a time instant t1, the capacitor C1 is in a discharged state due to the flow the current $I_{Q1}$ through the switching transistor Q1 in its conducting state; hence, the voltage $V_{Q1ds}$ across the capacitor C1 (and therefore the transistor Q1) is substantially zero. When the gate of switching transistor Q1 turns OFF (in its non-conducting state) at a time instant t1 by the control voltage signal $V_1$ transitioning low, the current $I_{Q1}$ through the transistor Q1 may rapidly drop to zero as shown in FIG. 2D. If the current fall time to reach zero is sufficiently short, the voltage across the transistor Q1 remains relatively close to zero as the transistor Q1 transitions from its ON state (its conducting state) to its OFF state (its non-conducting state), due to the discharged capacitor C1 being connected in parallel with the transistor Q1 and taking additional time to charge. Hence, the use of the capacitor C1 may result in a significant reduction in transistor switching losses during the transition of the switching transistor Q1 from its ON state to its OFF state.

As the capacitor C1 charges after the time instant t1, the voltage $V_{Q1ds}$ across the capacitor C1 (and therefore across the transistor Q1) increases as shown in FIG. 2D. Once the voltage $V_{Q1ds}$ reaches the level of the input voltage $V_{in}$ at a time instant t2, voltages across the transformer windings 22 and 24 start to change their polarity, which in turn causes the body diode of the switching transistor Q4 to become forward biased. Hence, the forward biasing of the switching transistor Q4 causes it to conduct, thereby providing a path for a current from the inductor L1 and a magnetizing current from the transformer T1. Additionally, at the time instant t2, the control voltage signal $V_f$ transitions high, which provides a current path through the switching transistor Q4 (in its conducting state) with lower conduction losses than the body diode of the transistor Q4. As a result, the transformer secondary winding 24 becomes shorted by the conducting switching transistors Q2–Q4. During this period of time, energy stored in the magnetic field of the transformer T1 is preserved at the level it reached at the time instant t2.

As previously described, during the time period t1–t2, the capacitor C1 is charged until its voltage the voltage $V_{Q1ds}$ reaches the input voltage $V_{in}$ at the time instant t2. The capacitor C1 remains at this voltage level until the switching transistor Q2 and Q3 (bidirectional switch 29) are turned OFF by the control voltage $V_r$ of FIG. 2B transitioning low at a time instant t3. At the time instant t3, energy stored in the transformer T1 releases and the capacitor C1 resumes charging and at the same time provides for a reset of the transformer. In other words, the voltage reversal (polarity reversal) of the transformer T1 initiates the reset of the transformer's magnetizing inductance.

When all the energy stored in the transformer T1 is released, the voltage $V_{Q1ds}$ across the capacitor C1 reaches its maximum as shown in FIG. 2D. After that, the capacitor C1 discharges through the primary winding 22. At a predetermined moment (instant t4 of FIG. 2D), which is characterized by values of the magnetizing inductance of the transformer T1 and the capacitance of the capacitor C1, the voltage $V_{Q1ds}$ reaches a value of substantially zero (it may even become negative, but due to the body diode of the transistor Q1 clamping negative voltage across the transistor Q1, it remains very close to the zero level).

If the control voltage signal $V_1$ ($V_r$) at the gate of the switching transistor Q1 (Q2+Q3) turns the switching transistor Q1 (Q2+Q3) ON after the time instant t4, such as at a time instant t5, both the current $I_{Q1}$ through the switching transistor Q1 and voltage $V_{Q1ds}$ across the switching transistor Q1 will be substantially equal to zero. The control voltage signal Vr and the switching transistors Q2+Q3 are in parenthesis to indicate that the control signals $V_1$ and $V_r$ may turn ON the switches at the same time. In another embodiment, an additional time delay for the current $I_{Q1}$ rising edge may be provided by delaying the bi-directional switch 29 (switching transistors Q2, Q3) turn on instant over the turn on instant of the switching transistor Q1. In this case, the front edge of the current $I_{Q1}$ is further delayed over the time instant t4. The switching power losses associated with parasitic capacitance discharge of the switching transistor Q1 and the transition of the switching transistor Q1 into its ON state will be eliminated or substantially reduced. Hence, the use of the capacitor C1 may significantly reduce switching power losses when the switching transistor Q1 transitions to its ON state.

In accordance with one embodiment of the present invention, the ON time for the transistors Q2 and Q3 (when control voltage $V_r$ is high) may be constant; however, it is longer than the ON time for the switching transistor Q1 (when control voltage signal $V_1$ is high), as illustrated by comparing FIGS. 2A and 2B. Changing the ON time duration of the transistor Q1 results in only the change of the pause (t3–t2) duration during which the voltage $V_{Q1ds}$ remains substantially at the level of the voltage $V_{in}$. For example, in the case of a shorter time duration for the pulse of current $I_{Q1}$, there is a longer pause t3–t2 during which the voltage $V_{Q1ds}$ remains at the level of the voltage $V_{in}$. This longer pause is shown in FIG. 2D with the voltage $V_{Q1ds}$ being shown by a dashed line 44 for comparison purposes. Adjusting the duration of pulse of current $I_{Q1}$, and therefore the pause t3–t2, adjusts a duty cycle of the power converter 10, but the switching frequency remains the same. This feature may allow the power converter 10 to maintain substantially zero voltage switching for a wide range of input voltages and loading conditions, while operating at a fixed switching frequency and using pulse width modulation control. This may provide a more desirable switch voltage waveform shape, maintain fixed (high) switching frequency regardless of the load and input voltage level, which may allow for reduction in the size of an input EMI (electromagnetic interference) filter.

The control signal $V_f$ of the switching transistor Q4 may be substantially inverted in relation to the control signal $V_1$ of the switching transistor Q1. However, a small dead time $\Delta t$, as shown in FIG. 2C, may be used to prevent cross-conduction between these two switching transistors Q1 and Q4.

The above-described operation cycle may be repeated continuously, thereby taking power from the voltage source 26 and converting the input voltage $V_{in}$ into a sequence of high frequency voltage pulses generated on the secondary side, so as to deliver power to the load 20. The load 20 may comprise any load, such as a hard drive (HDD), a memory, a central processor unit (CPU) and like devices. The output voltage $V_o$, which corresponds with the mean level of the voltage pulses, is extracted by the output filter 16 and is provided at the load terminals 32 and 38 to the load 20.

The output voltage $V_o$ may be proportional to the output duty cycle of the switching transistor Q1. As previously described, the error amplifier 40 of the control circuit 18 may compare the output voltage $V_o$ with a reference voltage, and generate the error signal. In one embodiment, this error signal may vary the control voltage signal $V_1$ so as to adjust the trailing edge of its ON cycle, as shown by the double ended arrow 45 in FIG. 2A. The ON cycle of the switching transistor Q1 may define an "activation time period" for the switching transistor Q1. The duration of the ON cycle (activation time period) of the control voltage signal determines the output duty cycle of the converter 10 so that the output voltage remains constant. As previously described, the duration of the ON cycle determines the duration of the pause t3–t2. Consequently, the output voltage $V_o$ of the converter 10 may be regulated by modulating the ON time of the switching transistor Q1 at a fixed switching frequency, which may be referred to as "pulse width modulation". More generally, the control circuit 18, through its control voltage signals $V_1$, $V_r$, $V_f$, determines the duty cycles of the switching transistors Q1–Q4. For example, as the output duty cycle (activation time period) of the switching transistor Q1 is varied, the duty cycle of the switching transistor Q4 may be correspondingly varied so as to maintain a suitably small dead time Δt, as shown in FIG. 2C, while activation time period of the switching transistors Q2 and Q3 remains constant.

Considerable reduction of switching losses may make the power converter 10 different from some power converters using traditional "hard-switching", where high levels of switching MOSFET current and voltage are generated during each transition state. This may result in substantially lower power dissipation and may provide an opportunity to boost switching frequency, reduce converter size, and increase power density of the power converter 10. The energy stored in the leakage inductance of the transformer T1 may not need to be dissipated in the snubber circuits, as may occur in some conventional single ended converters. Instead, the energy may be stored in the capacitor C1 and may be subsequently recuperated into the load 20.

Since voltage across the capacitor C1 at the moment of switching substantially equals zero, the energy stored in the capacitor C1 is also is substantially equals zero, regardless of the capacitance value of the capacitor C1. This in turn may provide an opportunity to increase the capacitance of the capacitor C1 without any performance degradation so as to reduce voltage ramp rate, eliminate voltage spikes on the switching transistor Q1 and to eliminate the need for snubber circuits, thereby increasing efficiency. The power converter 10 may achieve relatively higher power density by increasing the switching frequency and reducing magnetic and filter components dimensions. The increased efficiency of the power converter 10 may allow for a reduction of any associated heatsink size. Using substantially zero voltage switching and pulse width modulation in a combination with only one primary side switching MOSFET (switching transistor Q1) may provide a simple and a cost effective solution for high power density converters.

The resonant components of the power converter 10, the power transformer windings 22 and 24, the capacitor C1, and the back-to-back connected secondary transistors Q2 and Q3 (bidirectional switch 29), as well as its control signal arrangement of the control circuit 18, may contribute to the power converter maintaining substantially zero voltage switching, thereby eliminating or reducing switching losses in the wide range of input voltages and loading conditions while operating at a fixed (relatively high) switching frequency.

Figure 3:
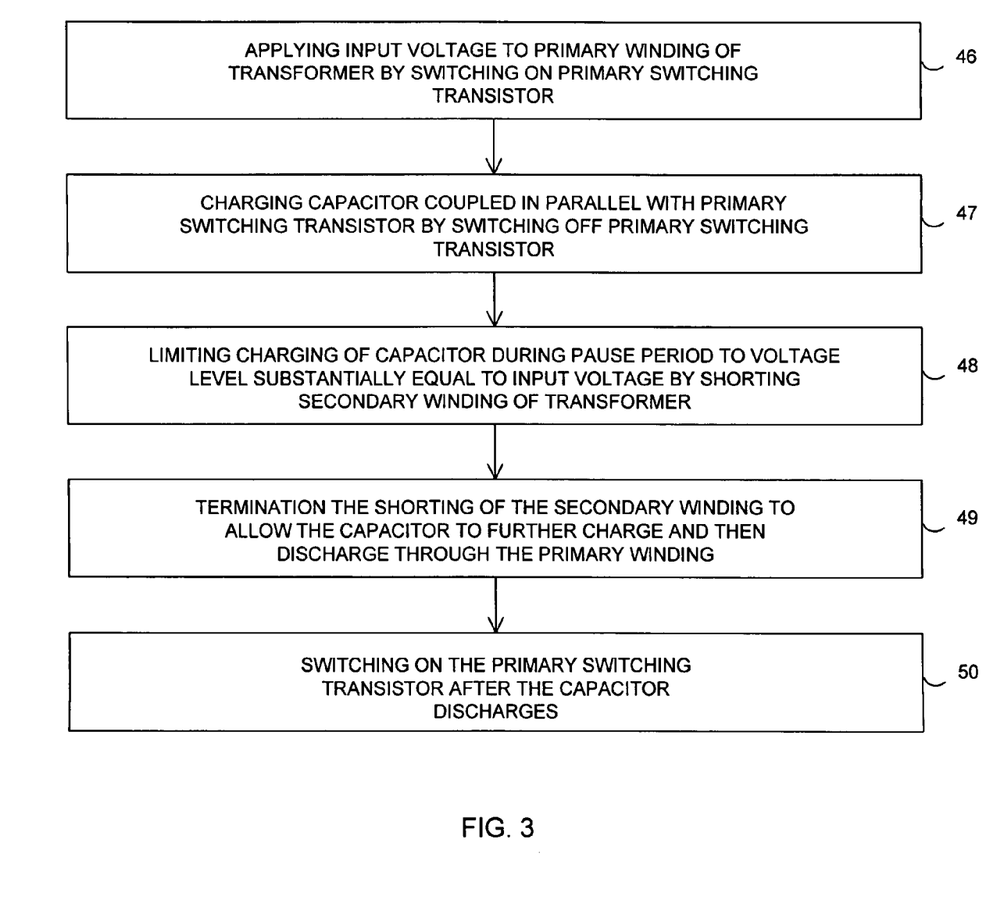
FIG. 3 is a flow chart of a power conversion process according to one method of the present invention.

Referring to FIG. 1B and FIG. 3, a power conversion process is described. At 46 in FIG. 3, the power conversion process includes applying the input voltage $V_{in}$ to the first end of the primary winding 22 of the transformer T1 by switching on the primary switching transistor Q1 coupled between the second end of the primary winding 22 and the primary ground 28. In one embodiment, the applying of the input voltage $V_{in}$ to the first end of the primary winding 22 of the transformer T1 may include inducing a positive voltage in the secondary winding 24 of the transformer T1. In one embodiment, the inducing of the positive voltage in the secondary winding 24 of the transformer T1 may include turning on the primary switching transistor Q1 and the bi-directional switch 29 at the same time.

At 47 of FIG. 3, the power conversion process further includes charging the capacitor C1 coupled in parallel with the primary switching transistor Q1 by switching off the primary switching transistor Q1. At 48 of FIG. 3, the power conversion process further includes limiting the charging of the capacitor C1 during the pause period to a voltage level substantially equal to the input voltage $V_{in}$ by shorting the secondary winding 24 of the transformer T1. In one embodiment, the limiting of the charging of the capacitor C1 during the pause period to the voltage level substantially equal to the input voltage $V_{in}$ by shorting the secondary winding 24 of the transformer T1 may include providing the bi-directional switch 29 coupled in series between the secondary winding 24 and the output filter 16 in an on state and the shunt switching transistor Q4 coupled in parallel with the output filter 16 in an on state after the primary switching transistor Q1 is switched off. In one embodiment, the providing of the bi-directional switch 29 in the on state and the shunt switching transistor Q4 in the on state after the primary switching transistor Q1 is turned off may further include turning on the shunt switching transistor Q4 after the primary switching transistor Q1 turns off but before the bi-directional switch 29 turns off.

At 49 of FIG. 3, the power conversion process further includes terminating the shorting of the secondary winding 24 to allow the capacitor C1 to further charge and then discharge through the primary winding 22. In one embodiment, the terminating of the shorting of the secondary winding 24 to allow the capacitor C1 to further charge and then discharge through the primary winding 22 may include turning off the bi-directional switch 29. At 50 of FIG. 3, the power conversion process includes switching on the primary switching transistor Q1 after the capacitor C1 discharges.

Figure 4:
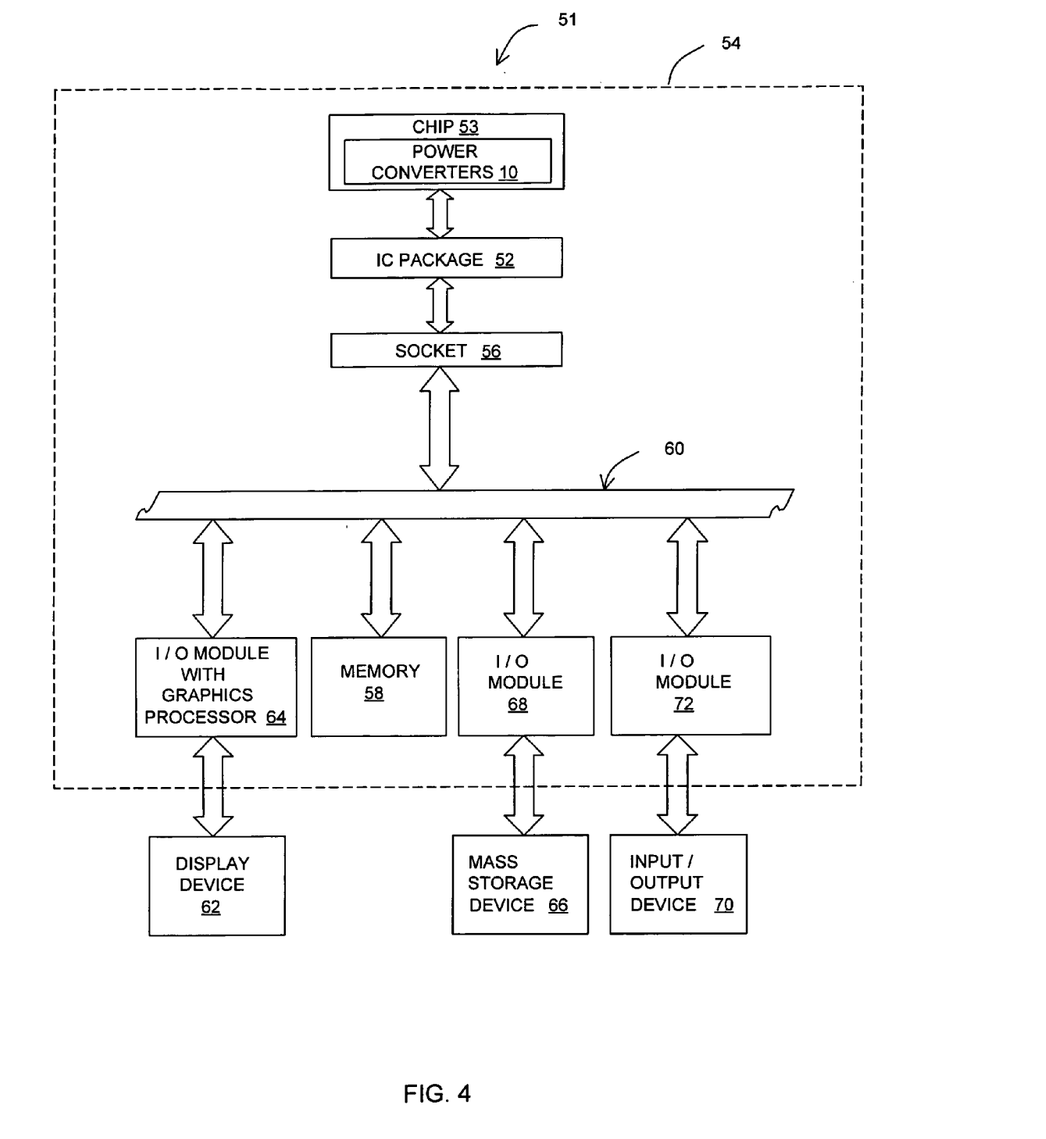
FIG. 4 is a block diagram of a system incorporating the power converter of FIGS. 1A and 1B according to one embodiment of the present invention.

Referring to FIG. 4, there is illustrated a computer system 51, which is one of many possible systems in which an integrated circuit (IC) package 52 may be used. The IC package 52 may include an IC chip 53 with power subsystems utilizing power converters 10 of FIGS. 1A and 11B for power conversion, according to one embodiment of the present invention. For example, in one embodiment, the computer system 51 may be a server wherein increasing power density and cost reduction of the power converters are desirable. However, the various embodiments of the present invention are applicable to systems other than computer systems, and the computer system 51 is merely illustrative of one application. In the system 51, the IC package 52 is mounted on a substrate or printed circuit board (PCB) 54 via a socket 56. The IC chip 53 of the IC package 52 may be a processor and the PCB 54 may be a motherboard. In addition to the socket 56 and the IC package 52, the PCB 54 may have mounted thereon a main memory 58 and a plurality of input/output (I/O) modules for external devices or external buses, all coupled to each other by a bus system 60 on the PCB 54. More specifically, the system 51 may include a display device 62 coupled to the bus system 60 by way of an I/O module 64, with the I/O module 64 having a graphical processor and a memory. The I/O module 64 may be mounted on the PCB 54 or may be mounted on a separate expansion board. The system 51 may further include a mass storage device 66 coupled to the bus system 60 via an I/O module 68. Another I/O device 70 may be coupled to the bus system 60 via an I/O module 72. Additional I/O modules may be included for other external or peripheral devices or external buses.

Examples of the main memory 58 include, but are not limited to, static random access memory (SRAM) and dynamic random access memory (DRAM). Examples of the mass storage device 66 include, but are not limited to, a hard disk drive, a compact disk drive (CD), a digital versatile disk driver (DVD), a floppy diskette, a tape system and so forth. Examples of the input/output devices 70 may include, but are not limited to, devices suitable for communication with a computer user (e.g., a keyboard, cursor control devices, microphone, a voice recognition device, a display, a printer, speakers, and a scanner) and devices suitable for communications with remote devices over communication networks (e.g., Ethernet interface device, analog and digital modems, ISDN terminal adapters, and frame relay devices). In some cases, these communications devices may also be mounted on the PCB 54. Examples of the bus system 60 include, but are not limited to, a peripheral control interface (PCI) bus, and Industry Standard Architecture (ISA) bus, and so forth. The bus system 60 may be implemented as a single bus or as a combination of buses (e.g., system bus with expansion buses). Depending upon the external device, I/O modules internal interfaces may use programmed I/O, interrupt-driven I/O, or direct memory access (DMA) techniques for communications over the bus system 60. Depending upon the external device, external interfaces of the I/O modules may provide to the external device(s) a point-to point parallel interface (e.g., Small Computer System Interface—SCSI) or point-to-point serial interface (e.g., EIA-232) or a multipoint serial interface (e.g., FireWire). Examples of the IC chip 53 may include any type of computational circuit such as, but not limited to, a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), or any other type of processor or processing circuit.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An apparatus, comprising:
   a transformer having a primary winding and a secondary winding;
   a switching circuit, including a primary active switch and a capacitor commonly coupled in parallel between a primary ground and the primary winding, to facilitate a periodic application of an input voltage to the primary winding;
   a synchronous rectification circuit coupled to the secondary winding to generate a rectified signal;
   an output filter coupled to the synchronous rectification circuit to provide an output voltage in response to the rectified signal;
   the synchronous rectification circuit includes a bi-directional switch coupled in series between the secondary winding and the output filter and a shunt active switch coupled in parallel with the output filter;
   a control circuit, coupled to the output filter, the synchronous rectification circuit, and the primary active switch, and responsive to the output voltage to provide a first control signal to the primary active switch to regulate the output voltage by varying a conductive state of the primary active switch;
   the control circuit further arranged to provide a second control signal to the bi-directional switch to control a conductive state of the bi-directional switch; and
   the conducting state for the bi-directional switch extending for a first time period after an end of the conducting state for the primary active switch.

2. The apparatus according to claim 1, wherein the primary active switch is a switching transistor.

3. The apparatus according to claim 2, wherein the switching transistor is a MOSFET transistor.

4. The apparatus according to claim 1, wherein
   the primary active switch of the switching circuit and the bi-directional switch each have a non-conducting state.

5. The apparatus according to claim 1, wherein the conducting state of the primary active switch of the switching circuit and the conducting state of the bi-directional switch begin substantially at a same time instant.

6. The apparatus according to claim 1, wherein the shunt active switch has a conducting state and a non-conducting state; and the conducting state of the bi-directional switch extends for a second time period after a beginning of the conducting state of the shunt active switch.

7. The apparatus according to claim 6, wherein the beginning of the conducting state of the shunt active switch occurs after a dead time period which follows the end of the conducting state of the primary active switch of the switching circuit, with the first time period being longer than the second time period.

8. The apparatus according to claim 1, wherein the the conductive state of the primary active switch determines a duty cycle of the primary active switch.

9. The apparatus according to claim 1, wherein the control circuit, in response to the first control signal, is arranged to modulate an activation time period of the primary active switch of the switching circuit to regulate the output voltage.

10. The power converter of claim 9, wherein the control circuit is further arranged to modulate a trailing edge of the activation time period.

11. The apparatus according to claim 7, wherein the conducting state of the primary active switch of the switching circuit and the conducting state of the bi-directional switch begin substantially at a same time instant.

12. The apparatus according to claim 1, wherein
    the control circuit is further arranged to provide a third control signal to the shunt active switch to switch between a pair of states of the shunt active switch, a conducting state and a non-conducting state; and
    the conducting state of the bi-directional switch extends for a second time period after a beginning of the conducting state of the shunt active switch.

13. The apparatus according to claim 12, wherein the beginning of the conducting state of the shunt active switch occurs after a dead time period which follows the end of the conducting state of the primary active switch of the switching circuit, with the first time period being longer than the second time period.

14. The apparatus according to claim 12, wherein
    the bi-directional switch includes a pair of active switches arranged such that in a non-conducting state each one blocks a current between the secondary winding and the output filter in an opposite direction and in a conducting state each transmits the current; and
    the control circuit is further arranged to provide the second control signal to a pair of commonly coupled gates of the pair of active switches to switch between the conducting and the non-conducting states of the pair of active switches.

15. The apparatus according to claim 14, wherein the primary active switch of the switching circuit, the pair of active switches of the bi-directional switch and the shunt active switch are MOSFET transistors.

16. A method, comprising:
applying an input voltage to a first end of a primary winding of a transformer by switching on a primary switching transistor coupled between a second end of the primary winding and a primary ground;
charging a capacitor coupled in parallel with the primary switching transistor by switching off the primary switching transistor;
limiting the charging of the capacitor during a pause period to a voltage level substantially equal to the input voltage by shorting a secondary winding of the transformer;
terminating the shorting of the secondary winding to allow the capacitor to further charge and then discharge through the primary winding;
switching on the primary switching transistor after the capacitor discharges.

17. The method according to claim 16, wherein
the applying of the input voltage to the first end of the primary winding of the transformer includes inducing a positive voltage in a secondary winding of the transformer; and
the limiting of the charging of the capacitor during the pause period to the voltage level substantially equal to the input voltage by shorting the secondary winding of the transformer includes providing a bi-directional switch coupled in series between the secondary winding and an output filter in an on state and a shunt switching transistor coupled in parallel with the output filter in an on state after the primary switching transistor is switched off.

18. The method according to claim 17, wherein the terminating of the shorting of the secondary winding to allow the capacitor to further charge and then discharge through the primary winding includes turning off the bi-directional switch.

19. The method according to claim 18, wherein the inducing of the positive voltage in the secondary winding of the transformer includes turning on the primary switching transistor and the bi-directional switch at the same time.

20. The method according to claim 19, wherein the providing of the bi-directional switch in the on state and the shunt switching transistor in the on state after the primary switching transistor is turned off further includes turning on the shunt switching transistor after the primary switching transistor turns off but before the bi-directional switch turns off.

21. A system, comprising:
an integrated circuit chip including a power converter, the power converter including a transformer having a primary winding and a secondary winding; a switching circuit coupled to the primary winding and adapted to periodically apply an input voltage to the primary winding, the switching circuit including a primary active switch and a capacitor commonly coupled in parallel between a primary ground and the primary winding; a synchronous rectification circuit coupled to the secondary winding to generate a rectified signal; an output filter coupled to the synchronous rectification circuit to provide an output voltage in response to the rectified signal; the synchronous rectification circuit includes a bi-directional switch coupled in series between the secondary winding and the output filter and a shunt active switch coupled in parallel with the output filter; a control circuit, coupled to the output filter, the synchronous rectification circuit, and the primary active switch, and responsive to the output voltage to provide a first control signal to the primary active switch to regulate the output voltage by varying a conductive state of the primary active switch; the control circuit further arranged to provide a second control signal to the bi-directional switch to control a conductive state of the bi-directional switch; and the conducting state for the bi-directional switch extending for a first time period after an end of the conducting state for the primary active switch;
a mass storage device; and
a bus coupled to the integrated circuit chip and the mass storage device.

22. The system according to claim 21, wherein the conducting state of the active switch of the switching circuit and the conducting state of the bi-directional switch begin substantially at a same time instant.

23. The system according to claim 22, wherein the shunt active switch has a conducting state and a non-conducting state; and the conducting state for the bi-directional switch extends for a second time period after a beginning of the conducting state of the shunt active switch.

24. The system according to claim 23, wherein the beginning of the conducting state of the shunt active switch occurs after a dead time period which follows the end of the conducting state of the active switch of the switching circuit, with the first time period being longer than the second time period.

25. The method according to claim 16, further comprising:
varying the pause period to accommodate variations in the input voltage.

* * * * *